United States Patent [19]
Fleming

[11] Patent Number: 5,685,974
[45] Date of Patent: Nov. 11, 1997

[54] COMPACT, EFFICIENT, MONITORABLE IMMISCIBLE FLUID SEPARATOR

[75] Inventor: William E. Fleming, Los Gatos, Calif.

[73] Assignee: Fluid Separation Technologies Inc., San Jose, Calif.

[21] Appl. No.: 616,352

[22] Filed: Mar. 15, 1996

[51] Int. Cl.$^6$ .................. B01D 17/028; B01D 17/12
[52] U.S. Cl. .................. 210/95; 210/187; 210/519; 210/521; 210/532.1; 210/540
[58] Field of Search .................. 210/86, 95, 121, 210/127, 187, 513, 519, 521, 532.1, 533–535, 538–540; 137/172

[56] References Cited

U.S. PATENT DOCUMENTS

| | | | |
|---|---|---|---|
| 1,197,634 | 9/1916 | Hull . | |
| 1,401,976 | 1/1922 | Giovannoni . | |
| 2,240,182 | 4/1941 | Guildner et al. | 210/123 |
| 2,375,282 | 5/1945 | Clemens | 210/95 |
| 2,605,220 | 7/1952 | Logan | 210/539 |
| 2,755,933 | 7/1956 | Profit . | |
| 3,362,534 | 1/1968 | Kay . | |
| 3,493,494 | 2/1970 | Knibb | 210/187 |
| 3,875,066 | 4/1975 | Lind | 210/521 |
| 4,257,890 | 3/1981 | Hurner | 210/112 |
| 4,624,779 | 11/1986 | Hurner | 210/180 |
| 4,915,823 | 4/1990 | Hall | 210/95 |
| 4,938,878 | 7/1990 | Hall | 210/532.1 |
| 4,995,974 | 2/1991 | Gänsgasse et al. | 210/247 |
| 4,995,992 | 2/1991 | Hurner | 210/803 |
| 5,264,121 | 11/1993 | Guzman-Sanchez | 210/117 |
| 5,453,197 | 9/1995 | Strefling | 210/540 |
| 5,471,964 | 12/1995 | Hurner | 210/187 |
| 5,534,138 | 7/1996 | Coale | 210/540 |
| 5,575,909 | 11/1996 | Foster | 210/521 |

*Primary Examiner*—Joseph W. Drodge
*Attorney, Agent, or Firm*—Donald E. Schreiber

[57] ABSTRACT

Disclosed is a fluid separator for isolating a component from a composite fluid having one fluid entrained within, but immiscible in, another fluid, and the two fluids have differing specific gravities. An enclosed chamber of the separator houses an elongated spillway having a first end that receives the composite fluid through an inlet-port. A second end of the spillway, located in the chamber's sump, includes spillway outlet-ports for discharging the composite fluid into the chamber. The separator also includes a flat, first solid plate that slopes diagonally across the chamber from the top of the spillway near the inlet port to the sump. A flat, second solid plate slopes diagonally across the chamber from the bottom of the spillway in the sump to a juncture with the first solid plate. Fluid flowing through the separator passes through gaps between the peripheries of the first and second plates and a wall that encloses the chamber. An outlet-port baffle within the chamber establishes a partially open cavity adjacent to an outlet-port that admits to the outlet-port the flow of the fluid discharged from the separator. V-shaped baffles secured within the sump and top of the chamber restrain movement of isolated contaminants. A top, sump and several multi-purpose ports pierce the walls of the outer housing at various locations to receive valves and other accessories.

34 Claims, 4 Drawing Sheets

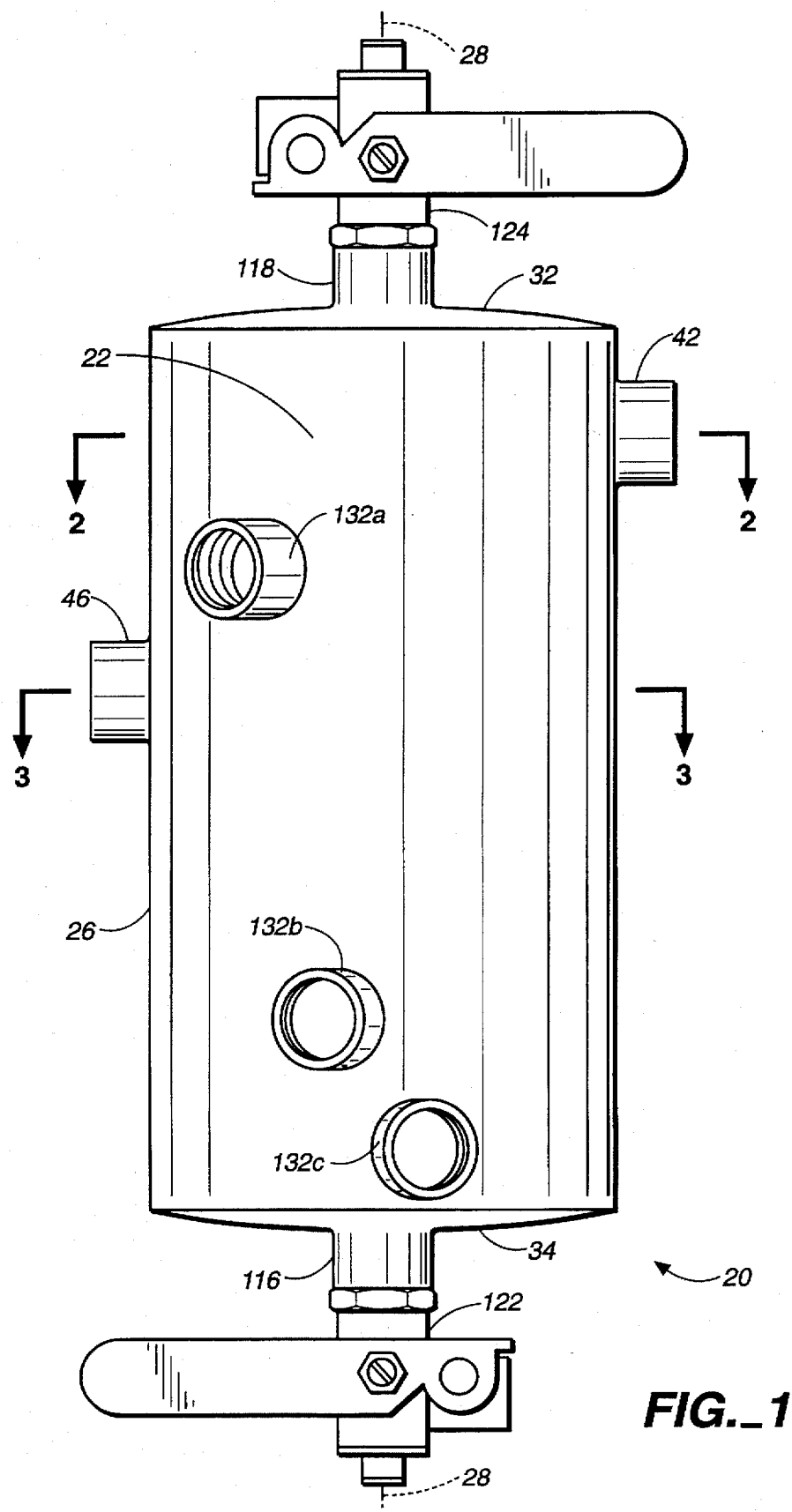
FIG._1

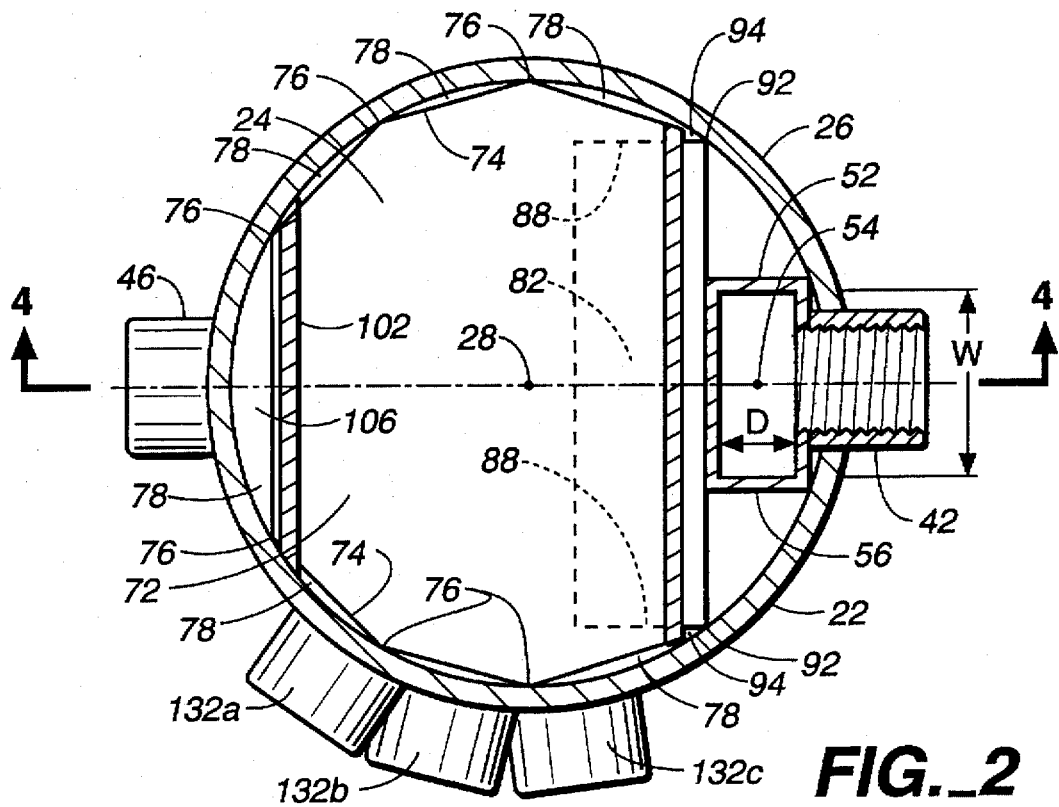
FIG._2
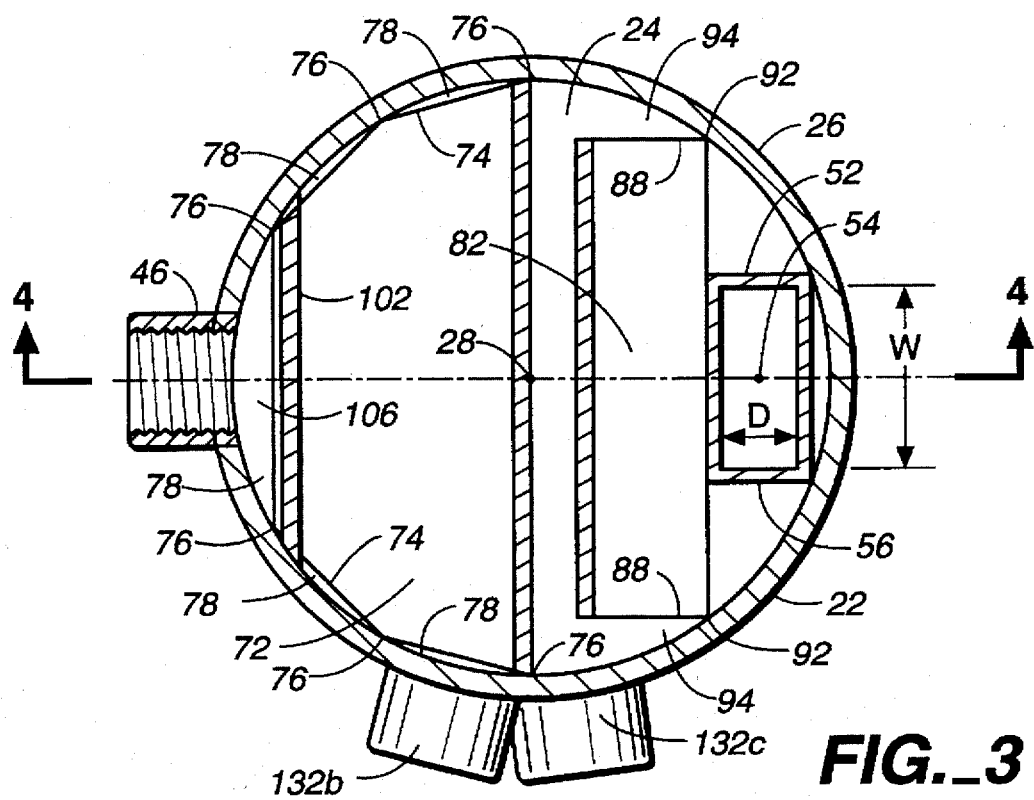
FIG._3

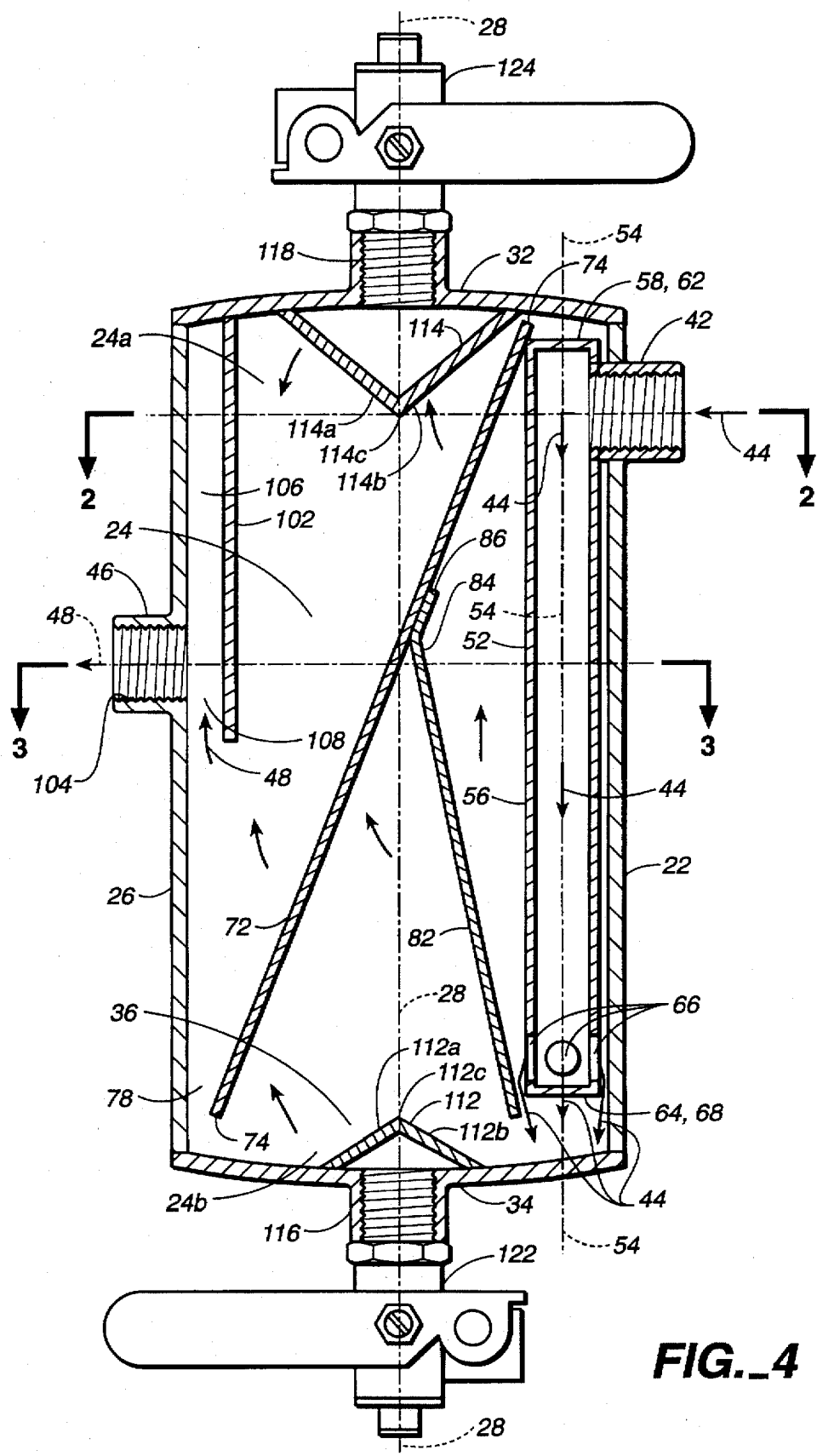
FIG._4

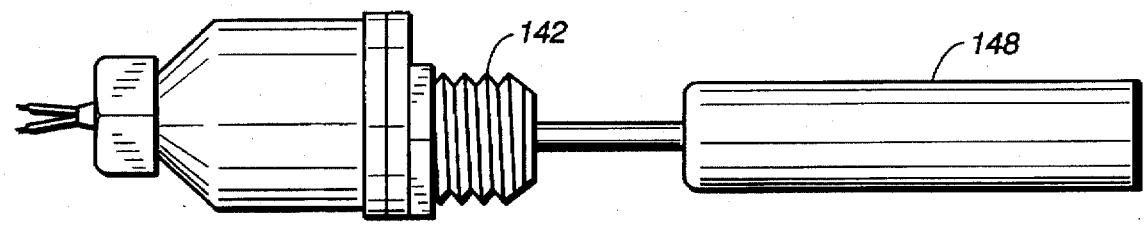
FIG._5
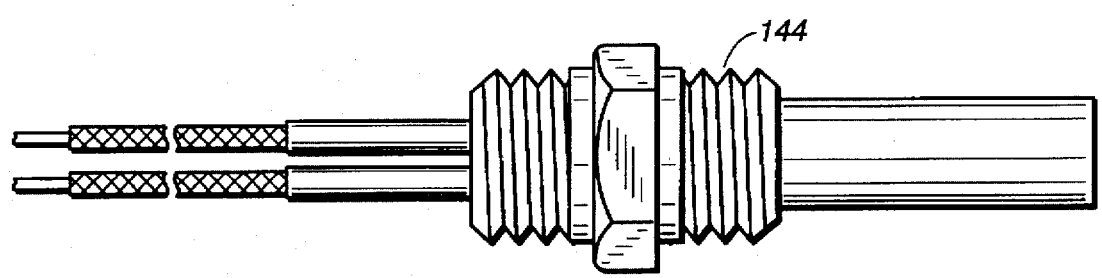
FIG._6
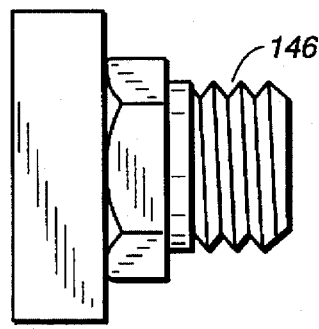
FIG._7

COMPACT, EFFICIENT, MONITORABLE IMMISCIBLE FLUID SEPARATOR

BACKGROUND OF THE INVENTION

1. Field of the Invention

The present invention relates generally to fluid separators, and, more particularly, to separators for a composite fluid in which a first fluid is entrained within, but is immiscible in, a second fluid, and the first fluid and the second fluid have differing specific gravities.

2. Description of the Prior Art

Most chemicals and fuels in commercial use today entrain surprisingly large quantities of water and other contaminants. Storage tank condensation, tank filling, and chemical decomposition during storage contribute significantly to this problem. The longer a material is stored, the more severe the problem becomes. Separation of water and/or other contaminants from chemicals and fuels, therefore, is a problem that has long plagued chemical formulators, fuel distributors, and even fuel users. The presence of water and other contaminants can ruin engines, pumps and control valves, and can also change the formulation of materials prepared by mixing different materials.

Cold temperatures exacerbates this material contamination problem, even to the extent of causing water entrained in a material to form ice. Moreover, at normal ambient storage temperatures the high viscosity of many materials make them unsuitable for further processing, or for use as a fuel.

Presently, three different classes of devices are widely used for removing contaminants from a fluid material, filters, gravity settlement, and cyclonic precipitators. All of these technologies have significant shortcoming, particularly in the chemical formulating industry. For example, in general, all classes of devices are inflexible in that they are designed to process a particular group of materials. Consequently, a need exists for a fast, safe, flexible and efficient way to process a wide range of different materials.

In particular, replacement cartridge type filters suffer from short working life, blockage, high maintenance cost including downtime for replacement, and environmental impact. Moreover, government requirements for environmentally safe cartridge disposal significantly increase the burden and expense of using replacement type filters.

Alternatively, gravity type separators are used mainly for immiscible fluids that are easily separated, such as diesel fuel and water. However, most such separators have internal valve seats, flow valves, seals, and small orifices that can plug or freeze, and therefore stop functioning properly. These problems are particularly severe in the private packaging industry where manufacturers run hundreds of small contract formulating jobs, many of which employ unique and hazardous materials. Many such materials pose extremely difficult separation problems that present gravity separators cannot resolve.

Inherently because of their structure, cyclonic precipitators are comparatively expensive, and usually have moving parts, such as bearings, which limits a precipitator's service life.

U.S. Pat. No. 3,362,534 which issued Jan. 9, 1968, on an application filed in the name of Guenter L. Kay ("the Kay patent") discloses a "Fuel-water separator Method and Apparatus." The Kay patent discloses directing a laminar fluid flow, that contains droplets of a more dense liquid entrained in a matrix liquid, downward against and along the length of a scabrous surface formed on a separating baffle that is enclosed within an outer housing. The fluid flow preferably impinges upon the surface at an angle that is between 0°, i.e. parallel to the surface, and 60°. The separator is designed so that fluid flow along the scabrous surface is non-turbulent and laminar. The baffle, whose top edge and side edges seal against the outer housing, is shaped to provide a slot-like orifice through which the fluid passes after flowing along the length of the scabrous surface. The baffle terminates well above the bottom of the outer housing to provide a sump for collecting the denser liquid.

The Kay patent discloses that as the fluid passes through the slot-like orifice at the lower edge of the baffle, downward motion imparted to globules of the denser liquid urges them to continue traveling downward into the sump, while the matrix liquid, e.g. diesel fuel, reverses its flow and travels upward toward an outlet port. The velocity of the matrix fluid decreases substantially as it leaves the slot-like orifice because the chamber beneath the orifice provides a passageway having a cross section that is at least several times greater than that of the slot-like orifice. The Kay patent reports that the separator's efficiency ranges between 95 and 99%.

The Kay patent discloses that the scabrous or roughened surface, direction of fluid flow along the surface, and laminar flow are critical to the separator's successful operation. Moreover, the Kay patent states that the efficiency of the separator is significantly affected by the spacing of the slot-like orifice, and that in fabricating a separator the orifice's width should be varied to determine an orifice having optimum efficiency.

U.S. Pat. No. 1,197,634 which issued Sep. 12, 1916, on an application filed in the name of Nathaniel D. Hull ("the Hull patent") discloses a "Filter" in which a downward flow of fluid through a pipe enters a deflector bowl that directs the flow of fluid upward through orifices located between the pipe and the deflector bowl. Conically-shaped screens, spaced along the length of the pipe above the deflector bowl, catch foreign matter which then drops through a gap between the deflector bowl and the filter's outer housing into a sump located beneath the deflector bowl. U.S. Pat. Nos. 4,257,890 and 4,995,992 which respectively issued Mar. 24, 1981, and Feb. 26, 1991, on applications filed in the name of Erwin E. Hurner disclose separators that are, in many respects, analogous to the separator disclosed in the Hull patent.

SUMMARY OF THE INVENTION

An object of the present invention is to provide an improved, immiscible fluid separator that is capable of swift, flexible and efficient isolation of various different materials.

Another object of the present invention is to provide an improved, immiscible fluid separator that resists plugging.

Another object of the present invention is to provide an improved, hermetically sealed, immiscible fluid separator that has no moving parts, or internal seals or seats.

Another object of the present invention is to provide an improved, immiscible fluid separator that is easy to maintain.

Another object of the present invention is to provide an improved, immiscible fluid separator that has a long service life.

Another object of the present invention is to provide an improved, immiscible fluid separator that has minimal adverse environmental impact.

Yet another object of the present invention is to provide an improved, immiscible fluid separator which is simple, that is cost effective, and easy to manufacture.

Briefly, a fluid separator in accordance with the present invention isolates a component from a composite fluid in which a first fluid is entrained within, but is immiscible in, a second fluid, the two fluids having differing specific gravities. The fluid separator includes an outer housing that encloses a chamber. The outer housing includes a side wall, that is preferably formed in the shape of a right circular cylinder encircling a vertical axis of the chamber. The side wall is closed at an upper end of the chamber by a top wall, that is preferably dome-shaped, and is closed at a lower end of the chamber by a bottom wall, that is also preferably dome-shaped. The domes of the preferred top and bottom walls are respectively oriented to establish a convex upper-end and a convex lower-end for the chamber, thereby establishing a sump at the lower end of the chamber.

The walls of the outer housing are pierced by a fluid inlet-port for receiving a flow of the composite fluid into the fluid separator, and by a fluid outlet-port for discharging a flow of the second fluid from the fluid separator. The fluid inlet-port preferably pierces the side wall of the outer housing at an input-port level which is above an output-port level at which the fluid outlet-port pierces the side wall. Moreover, the fluid inlet-port preferably pierces the side wall of the outer housing at a location which, if the fluid separator is viewed along the vertical axis of the chamber, is diametrically opposed to a location at which the fluid outlet-port pierces the side wall.

The fluid separator also includes an elongated, spillway having a longitudinal axis and a tubularly-shaped side wall. The longitudinal axis of the spillway is preferably oriented parallel to the vertical axis of the chamber, and the tubularly-shaped side wall preferably has a rectangular cross-sectional shape. The spillway is located within the walls of the outer housing, preferably immediately adjacent to the side wall thereof. A first end of the tubularly-shaped side wall is closed, and is preferably closely adjacent to the outer housing's top wall. The fluid inlet-port preferably pierces the spillway's side wall at a right angle to the spillway's longitudinal axis. Accordingly, the fluid inlet-port delivers the flow of the composite fluid directly into the spillway. The spillway has a second end, distal from the first end, that is preferably located in the sump. The spillway's second end includes a spillway outlet-port for discharging the flow of the composite fluid into the chamber. The spillway outlet-port preferably pierces the spillway's tubularly-shaped side wall, and the second end of the tubularly-shaped side wall is preferably closed.

The fluid separator also includes a preferably flat, first solid plate. The first solid plate is disposed within the outer housing to slope diagonally from one of the spillway's ends, across the chamber to the side wall of the outer housing in the sump of the chamber. The first solid plate has a periphery that is profiled to be juxtaposed with the side wall of the outer housing at a plurality of separated locations scattered about the side wall. The first solid plate's periphery is also profiled to establish a plurality of orifices individually located between the periphery of the first solid plate and the side wall of the outer housing, and between immediately adjacent pairs of locations at which the periphery juxtaposes with the side wall. Accordingly, the first solid plate obstructs the chamber and diverts fluid flowing from the fluid inlet-port to the fluid outlet-port through the orifices between the side wall and the periphery of the first solid plate.

The fluid separator also preferably includes a flat, second solid plate. The second solid plate is preferably disposed within the outer housing to slope diagonally from the end of the spillway that is located in the sump of the chamber, partway across the chamber to form a juncture and to seal with the first solid plate at an end of the second solid plate distal from the end of the spillway that is located in the sump. The second solid plate has a periphery that is profiled to be juxtaposed with the side wall of the outer housing at at least two separated locations about the side wall. The second solid plate's periphery is also profiled to establish at least two gaps respectively between the periphery of the second solid plate and the side wall of the outer housing, and between the locations at which the periphery juxtaposes with the side wall and the juncture between the second solid plate and the first solid plate. The second solid plate obstructs the chamber and diverts fluid flowing through the chamber from the fluid inlet-port to the fluid outlet-port through the gaps between the side wall and the periphery of the second solid plate.

The fluid separator also preferably includes an outlet-port baffle disposed within the chamber adjacent to a location at which the fluid outlet-port pierces the wall of the outer housing. The outlet-port baffle establishes a cavity adjacent to the fluid outlet-port and within the chamber that has an opening directed toward an end of the chamber, preferably the sump. The opening admits to the fluid outlet-port the flow of the second fluid discharged from the fluid separator.

The fluid separator also preferably includes a sump baffle secured within the sump of the chamber, and a top baffle secured within the upper end of the chamber. Both the sump baffle and the top baffle are preferably formed by two flat plates which are joined together along a common edge to form a V-shaped cross-section. Within the lower end of the chamber, the sump baffle is oriented to form an inverted V-shape within the sump, and is secured to the bottom wall. Analogously, the top baffle forms a V-shape within the upper end of the chamber, and is secured to the top wall. Preferably, a sump outlet-port pierces a nadir of the bottom wall beneath the sump baffle, and a top outlet-port pierces an apex of the top wall above the top baffle. Arranged in this way, the sump baffle obstructs the sump outlet-port, and the top baffle obstructs the top outlet-port.

The fluid separator also preferably includes a plurality of multi-purpose ports that respectively pierce the walls of the outer housing at various locations. Various different accessories, such as a heater, a sight glass, and/or a float switch, may be secured into the respective multi-purpose ports.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is an elevational view depicting a fluid separator in accordance with the present invention including the separator's fluid inlet-port and fluid outlet-port;

FIG. 2 is a plan cross-sectional view taken along the line 2—2 of FIG. 1 depicting the interior of the fluid separator at the level of the fluid inlet-port;

FIG. 3 is a plan cross-sectional view taken along the line 3—3 of FIG. 1 depicting the interior of the fluid separator at the level of the fluid outlet-port;

FIG. 4 is a partially sectioned, elevational view taken along the lines 4—4 respectively in FIGS. 2 and 3 that depicts the interior of the fluid separator in a plane that includes both the fluid inlet-port and the fluid outlet-port;

FIG. 5 in an elevational view of a float switch that may be secured in a port of the fluid separator;

FIG. 6 in an elevational view of a heater that may be secured in a port of the fluid separator; and FIG. 7 in an elevational view of a sight glass that may be secured in a port of the fluid separator.

DETAILED DESCRIPTION OF THE PREFERRED EMBODIMENT

FIG. 1 depicts a fluid separator in accordance with the present invention referred to by the general reference character 20. Referring now to FIGS. 1–4, the fluid separator 20 includes an outer housing 22 that encloses a chamber 24 illustrated in FIGS. 2–4. The outer housing 22 includes a side wall 26, that is formed in the shape of a right circular cylinder encircling a vertical axis 28 of the chamber 24. The side wall 26 is closed at an upper end of the chamber 24 by a top wall 32, that is dome-shaped. The side wall 26 is also closed at a lower end of the chamber 24 by a bottom wall 34, that is also dome-shaped. The domes of the top wall 32 and the bottom wall 34 are respectively oriented to establish a convex upper-end 24a and a convex lower-end 24b for the chamber 24, thereby also establishing a sump 36 at the lower end of the chamber 24.

The side wall 26 of the outer housing 22 is pierced by a threaded fluid inlet-port 42 for receiving into the fluid separator 20 a flow of a composite fluid illustrated in FIG. 4 by arrows 44. The side wall 26 is also pierced by a threaded fluid outlet-port 46 for discharging from the fluid separator 20 a flow of a second fluid illustrated in FIG. 4 by an arrow 48. The fluid inlet-port 42 pierces the side wall 26 of the outer housing 22 at an input-port level, illustrated in FIG. 4 by the line 2—2, which is above an output-port level at which the fluid outlet-port 46 pierces the side wall 26, illustrated in FIG. 4 by the line 3—3. Moreover, the fluid inlet-port 42 pierces the side wall 26 of the outer housing 22 at a location which, if the fluid separator 20 is viewed along the vertical axis 28 of the chamber 24 as depicted in FIG. 2, is diametrically opposed to a location at which the fluid outlet-port 46 pierces the side wall 26. The fluid inlet-port 42 and the fluid outlet-port 46 have equal cross-sectional areas.

The fluid separator 20 also includes an elongated, spillway 52 having a longitudinal axis 54 and a tubularly-shaped outer wall 56. The longitudinal axis 54 of the spillway 52 is oriented parallel to the vertical axis 28 of the chamber 24, and the tubularly-shaped outer wall 56 has a rectangular cross-sectional shape. The rectangular cross-sectional shape of the spillway 52 has an aspect ratio of approximately two to one (2:1) for a width W to a depth D of the outer wall 56. The spillway 52 has a cross-sectional area that is approximately 1.5 times greater than the cross-sectional area of the fluid inlet-port 42. The spillway 52 is located within the walls of the outer housing 22, immediately adjacent to the side wall 26. A first end 58 of the tubularly-shaped outer wall 56 is closely adjacent to the top wall 32 of the outer housing 22, and is closed by a plate 62. The fluid inlet-port 42 pierces the outer wall 56 of the spillway 52 at a right angle to the longitudinal axis 54 of the spillway 52. Accordingly, the fluid inlet-port 42 delivers the flow of the composite fluid directly into the spillway 52. The spillway 52 has a second end 64, distal from the first end 58, that is located in the sump 36. The second end 64 of the spillway 52 includes four spillway outlet-ports 66 which respectively pierce each side of the rectangularly-shaped outer wall 56. The second end 64 of the tubularly-shaped outer wall 56 is closed by a plate 68. The spillway outlet-ports 66, which discharge the flow of the composite fluid into the chamber 24, preferably have a total cross-sectional area that is no less than 3.0 times the cross-sectional area of the fluid inlet-port 42.

The fluid separator 20 also includes a flat, first solid plate 72. The first solid plate 72 is disposed within the outer housing 22 to slope diagonally from the first end 58 of the spillway 52, across the chamber 24 away from the spillway 52 to the side wall 26 of the outer housing 22 in the sump 36 of the chamber 24. The first solid plate 72 has a polygonally-shaped periphery 74 that is profiled to be juxtaposed with the side wall 26 of the outer housing 22 at a plurality of separated locations 76 scattered about the side wall 26 as depicted in FIGS. 2 and 3. The periphery 74 of the first solid plate 72 is also profiled to establish a plurality of orifices 78 individually located between the periphery 74 of the first solid plate 72 and the side wall 26 of the outer housing 22, and between immediately adjacent pairs of locations 76 at which the periphery 74 juxtaposes with the side wall 26. Accordingly, the first solid plate 72 obstructs the chamber 24 and diverts fluid flowing from the fluid inlet-port 42 to the fluid outlet-port 46 through the orifices 78 between the side wall 26 and the periphery 74 of the first solid plate 72. The orifices 78 have a total cross-sectional area that is 1.5 times the cross-sectional area of the fluid inlet-port 42.

The fluid separator 20 also includes a flat, second solid plate 82. The second solid plate 82 is disposed within the outer housing 22 to slope diagonally from the second end 64 of the spillway 52 that is located in the sump 36 of the chamber 24, partway across the chamber 24 away from the spillway 52 to form a juncture 84 and to seal with the first solid plate 72 at an end 86 of the second solid plate 82 distal from the second end 64 of the spillway 52. The second solid plate 82 has a rectangularly-shaped periphery 88 that is profiled to be juxtaposed with the side wall 26 of the outer housing 22 at two separated locations 92 about the side wall 26. The periphery 88 of the second solid plate 82 is also profiled to establish two gaps 94 respectively between the periphery 88 of the second solid plate 82 and the side wall 26 of the outer housing 22, and between the locations 92 at which the periphery 88 juxtaposes with the side wall 26 and the juncture 84 between the second solid plate 82 and the first solid plate 72. The second solid plate 82 obstructs the chamber 24 and diverts fluid flowing through the chamber 24 from the fluid inlet-port 42 to the fluid outlet-port 46 through the gaps 94 between the side wall 26 and the periphery 88 of the second solid plate 82. The gaps 94 have a total cross-sectional area that is 0.5 times the cross-sectional area of the fluid inlet-port 42.

The fluid separator 20 also includes a flat outlet-port baffle 102 disposed within the chamber 24 that depends from the top wall 32 of the outer housing 22 adjacent to a location at which the fluid outlet-port 46 pierces the wall of the outer housing 22. The outlet-port baffle 102 depends downward to a level beneath a lower edge 104 of the fluid outlet-port 46. The outlet-port baffle 102, which seals only with the side wall 26, establishes a cavity 106 adjacent to the fluid outlet-port 46 and within the chamber 24. The cavity 106 has an opening 108 that is directed toward the sump 36 of the chamber 24, and that has a cross-sectional area of approximately 1.5 times the cross-sectional area of the fluid inlet-port 42. The opening 108 admits to the fluid outlet-port 46 the flow of the second fluid discharged from the fluid separator 20 while blocking any lighter contaminants that may collect in the upper-end 24a of the chamber 24.

The fluid separator 20 also includes a sump baffle 112 secured within the sump 36 of the chamber 24, and a top baffle 114 secured within the upper end of the chamber 24. Both the sump baffle 112 and the top baffle 114 are formed by two flat plates, respectively 112a and 112b, and 114a and 114b, which are joined together along a common edge, respectively 112c and 114c, in a V-shaped cross-section. Within the lower end of the chamber 24, the sump 36 baffle is oriented to form an inverted V-shape within the sump 36, and is secured to the bottom wall 34. Analogously, the top baffle 114 forms a V-shape within the upper end of the chamber 24, and is secured to the top wall 32.

A sump outlet-port 116 pierces a nadir of the bottom wall 34 beneath the sump 36 baffle, and a top outlet-port 118 pierces an apex of the top wall 32 above the top baffle 114. The sump baffle 112 and the top baffle 114 respectively extend across the top wall 32 and the bottom wall 34 to the side wall 26, but do not seal with the side wall 26. Arranged in this way, the sump baffle 112 obstructs but does not block the sump outlet-port 116 while also restricting movement of heavier contaminants that collect between the sump baffle 112 and the bottom wall 34. Similarly, the top baffle 114 obstructs but does not block the top outlet-port 118 while also restricting movement of lighter contaminants that collect between the top baffle 114 and the top wall 32. Moreover, fluid circulating within the chamber 24 impinging either upon the V-shaped sump baffle 112 or upon the top baffle 114 is deflected toward the level 3—3 of the fluid outlet-port 46 which assists in isolating any contaminant entrained in the composite fluid.

In the illustrations of FIGS. 1 and 4, a sump valve 122 is screwed into the sump outlet-port 116, and a vent valve 124 is screwed into the top outlet-port 118. The sump valve 122 permits easily draining out of the fluid separator 20 a heavier contaminant first fluid, such as water, that enters the fluid separator 20 entrained in a composite fluid, and which the fluid separator 20 isolates from a lighter second fluid, such as diesel fuel, that is discharged from the fluid separator 20 via the fluid outlet-port 46. The vent valve 124 permits venting gas from the chamber 24 when the fluid separator 20 is initially filled with a fluid, and also permits discharging from the fluid separator 20 a fluid which is lighter than the second fluid discharged from the fluid outlet-port 46. Accordingly, a fluid discharged through the vent valve 124 might be a light, primary contaminant entrained by itself in the composite fluid entering the fluid separator 20 through the fluid inlet-port 42, or it might be a lighter secondary contaminant that is entrained in the composite fluid together with a heavier primary contaminant.

The fluid separator 20 also includes a plurality of threaded multi-purpose ports 132a, 132b and 132c that respectively pierce the walls of the outer housing 22 at various locations. Various different accessories, such as a float switch 142 depicted in FIG. 5, an electric heater 144 depicted in FIG. 6, and/or a sight glass 146 depicted in FIG. 7, may be screwed into the respective multi-purpose ports 132a, 132b or 132c. Alternatively, any of the multi-purpose ports 132a, 132b or 132c may also be used for discharging fluid from the fluid separator 20.

To permit electrically sensing when an excessive amount of the contaminant fluid collects inside the chamber 24, the float switch 142 is designed so a float 148 has a greater density than a lighter component, and a lesser density than a heavier component in the composite fluid entering the fluid separator 20 through the fluid inlet-port 42. Thus, with the float switch 142 secured in one of the multi-purpose ports 132a, 132b or 132c closing or opening of an electrical switch included in the float switch 142 signals passage past the float switch 142 of an interface between the two immiscible fluids. The preferred float switch 142 is marketed by Harwill, Corp. of Oxnard, Calif., and is adjustable for specific gravities between 0.3 and 1.3. The functioning of the heater 144 and the sight glass 146, well known to those skilled in the art, is conventional.

Operation of the fluid separator 20 isolates a component from a composite fluid in which a first fluid, having a first specific gravity, is entrained within, but is immiscible in, a second fluid having a different specific gravity from the first fluid. Impingement of the composite fluid entering the spillway 52 upon the outer wall 56 as such fluid flows turbulently down the spillway 52 from the first end 58 to the second end 64 in combination with a shearing of the fluid flowing through the spillway outlet-ports 66, the gaps 94 and the orifices 78, and with a shearing of any fluid impinging either upon the sump baffle 112 or upon the top baffle 114 efficiently and effectively isolates the first fluid from the second fluid. A fluid separator 20 that is seven (7) inches in diameter and thirty-two (32) inches high having a two (2) inch diameter fluid inlet-port 42 and fluid outlet-port 46 isolates 99.5% to 99.95% of water entrained in diesel fluid flowing through the fluid separator 20 at a flow rate of 0.5 to 100 gallons per minute. For this particular fluid separator 20, the outer wall 56 of the spillway 52 has an interior width W of 3.4 inches, and an interior depth D of 1.4 inches.

While the fluid outlet-port 46 is preferably located on the side wall 26 diametrically opposite the fluid inlet-port 42 as depicted in FIG. 2, a fluid separator 20 in accordance with the present invention may have the fluid outlet-port 46 located anywhere around the side wall 26. Moreover, while the fluid outlet-port 46 discharges the flow of the second fluid 48 when the fluid separator 20 is being used for separating a heavier fluid from a lighter fluid such as separating water from diesel fuel, in other applications of the fluid separator 20 the second fluid could be discharged from the fluid separator 20 either through the sump outlet-port 116, the top outlet-port 118 or through any of the multi-purpose ports 132a, 132b or 132c.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A fluid separator for isolating a component from a composite fluid in which a first fluid is entrained within, but is immiscible in, a second fluid; the first fluid and the second fluid having differing specific gravities; the fluid separator comprising:

an outer housing that encloses a chamber, said outer housing including a side wall that surrounds a vertical axis of the chamber, the side wall being closed at an upper-end of the chamber by a top wall, and being closed at a lower-end of the chamber by a bottom wall thereby establishing a sump at the lower-end of the chamber, the side wall of said outer housing being pierced by a fluid inlet-port for receiving a flow of the composite fluid into the fluid separator, and by a fluid outlet-port for discharging a flow of the second fluid from the fluid separator;

an elongated, spillway having a longitudinal axis and a tubularly-shaped side wall, said spillway being located within the walls of said outer housing, and having a first end at which the tubularly-shaped side wall is closed and said spillway is pierced by the fluid inlet-port for delivering the flow of the composite fluid into said spillway, and said spillway also having a second end, distal from the first end, which includes a spillway outlet-port for discharging the flow of the composite fluid into the chamber; and a first plate located within said outer housing, said first plate having a periphery that is profiled to be juxtaposed with the side wall of said outer housing at a plurality of separated locations scattered about the side wall, and the periphery also being profiled to establish a plurality of orifices individually located between the periphery of said first plate and the side wall of the outer housing and between immediately adjacent pairs of locations at which the periphery juxtaposes with the side wall, said first plate diverting fluid through the orifices between the side wall and the periphery of said first plate as the fluid flows through the chamber from the fluid inlet-port to the fluid outlet-port.

2. The fluid separator of claim 1 wherein the side wall of said outer housing is formed in the shape of a right circular cylinder that encircles the vertical axis of the chamber; and the top wall and bottom wall of said outer housing are respectively dome-shaped, and are oriented to establish a convex upper-end and a convex lower-end for the chamber.

3. The fluid separator of claim 1 wherein the fluid inlet-port pierces the side wall of the outer housing at an input-port level which is above an output-port level at which the fluid outlet-port pierces the side wall.

4. The fluid separator of claim 1 wherein the fluid inlet-port pierces the side wall of the outer housing at a location which, when the fluid separator is viewed along the vertical axis of the chamber, is diametrically opposed to a location at which the fluid outlet-port pierces the side wall.

5. The fluid separator of claim 1 further comprising a sump outlet-port which pierces a nadir of the bottom wall.

6. The fluid separator of claim 5 further comprising a sump baffle secured within the sump of the chamber to obstruct the sump outlet-port.

7. The fluid separator of claim 6 wherein the sump baffle has an inverted V-shape cross-section that is formed by two flat plates which are joined together along a common edge, the sump baffle being disposed over said sump outlet-port, and being secured to the bottom wall of said outer housing.

8. The fluid separator of claim 1 further comprising a top outlet-port which pierces an apex of the top wall.

9. The fluid separator of claim 8 further comprising a top baffle secured within the upper end of the chamber to obstruct the top outlet-port.

10. The fluid separator of claim 9 wherein the top baffle has a V-shape cross-section that is formed by two flat plates which are joined together along a common edge, the top baffle being disposed beneath said top outlet-port, and being secured to the top wall of said outer housing.

11. The fluid separator of claim 1 further comprising a multi-purpose port that pierces one of the walls of said outer housing.

12. The fluid separator of claim 11 further comprising a heater secured into the multi-purpose port for heating fluid contained within the chamber.

13. The fluid separator of claim 11 further comprising a sight glass secured into the multi-purpose port for observing fluid contained within the chamber.

14. The fluid separator of claim 11 further comprising a float switch secured into the multi-purpose port for sensing passage of an interface between the first fluid and the second fluid past said float switch.

15. The fluid separator of claim 1 wherein said spillway receives the flow of the composite fluid from the fluid inlet-port at a right angle to the longitudinal axis of said spillway.

16. The fluid separator of claim 15 wherein said spillway is disposed immediately adjacent to the side wall of the outer housing.

17. The fluid separator of claim 15 wherein the longitudinal axis of said spillway is oriented parallel to the vertical axis of the chamber.

18. The fluid separator of claim 1 wherein the spillway outlet-port pierces the tubularly-shaped side wall of said spillway, and the second end of said tubularly-shaped side wall is closed.

19. The fluid separator of claim 1 wherein a cross-sectional area of the spillway outlet-port is approximately 3.0 times a cross-sectional area of the fluid inlet-port.

20. The fluid separator of claim 1 wherein the tubularly-shaped side wall of said spillway has a rectangular cross-sectional shape.

21. The fluid separator of claim 20 wherein the rectangular cross-sectional shape of the tubularly-shaped side wall of said spillway has a width-to-depth aspect ratio of approximately two to one (2:1).

22. The fluid separator of claim 1 wherein said spillway has a cross-sectional area that is approximately 1.5 times a cross-sectional area of the fluid inlet-port.

23. The fluid separator of claim 1 wherein a cross-sectional area of all the orifices totals approximately 1.5 times a cross-sectional area of the fluid inlet-port.

24. The fluid separator of claim 1 wherein the first end of said spillway is closely adjacent to the top wall of said outer housing, and the second end of said spillway is located in the sump of the chamber.

25. The fluid separator of claim 24 wherein said first plate is flat and disposed within the outer housing to slope diagonally from one of the ends of said spillway, across the chamber to the side wall of the outer housing in the sump of the chamber.

26. The fluid separator of claim 25 further comprising a flat, second plate disposed within the outer housing to slope diagonally from the end of said spillway that is located in the sump of the chamber, partway across the chamber to form a juncture and to seal with said first plate at an end of said second plate distal from the end of said spillway that is located in the sump of the chamber.

27. The fluid separator of claim 26 wherein said second plate has a periphery that is profiled to be juxtaposed with the side wall of said outer housing at at least two separated locations about the side wall, and the periphery also being profiled to establish at least two gaps respectively between the periphery of said second plate and the side wall of the outer housing and between the locations at which the periphery juxtaposes with the side wall and the juncture between said second plate and said first plate, said second plate diverting fluid through the gaps between the side wall and the periphery of said second plate as the fluid flows through the chamber from the fluid inlet-port to the fluid outlet-port.

28. The fluid separator of claim 27 wherein a cross-sectional area of all the gaps totals approximately 0.5 times a cross-sectional area of the fluid inlet-port.

29. The fluid separator of claim 26 further comprising an outlet-port baffle disposed within the chamber adjacent to a location at which the fluid outlet-port pierces the wall of the outer housing, said outlet-port baffle establishing a cavity adjacent to the fluid outlet-port and within the chamber that has an opening directed toward one of the ends of the chamber for admitting to the fluid outlet-port the flow of the second fluid that is discharged from the fluid separator through the fluid outlet-port.

30. The fluid separator of claim 29 wherein the opening of the cavity is directed toward the sump of the chamber.

31. The fluid separator of claim 29 wherein a cross-sectional area of the opening is approximately 1.5 times a cross-sectional area of the fluid inlet-port.

32. The fluid separator of claim 1 further comprising an outlet-port baffle disposed within the chamber adjacent to a location at which the fluid outlet-port pierces the wall of the outer housing, said outlet-port baffle establishing a cavity adjacent to the fluid outlet-port and within the chamber that has an opening directed toward one of the ends of the chamber for admitting to the fluid outlet-port the flow of the second fluid that is discharged from the fluid separator through the fluid outlet-port.

33. The fluid separator of claim 32 wherein the opening of the cavity is directed toward the sump of the chamber.

34. The fluid separator of claim 32 wherein a cross-sectional area of the opening is approximately 1.5 times a cross-sectional area of the fluid inlet-port.

* * * * *